United States Patent [19]
Corey

[11] Patent Number: 6,024,819
[45] Date of Patent: Feb. 15, 2000

[54] FABRIC VENETIAN BLIND AND METHOD OF FABRICATION

[75] Inventor: John A. Corey, Melrose, N.Y.

[73] Assignee: Comfortex Corporation, Watervliet, N.Y.

[21] Appl. No.: 08/947,608

[22] Filed: Oct. 9, 1997

[51] Int. Cl.[7] ............................................ B65H 81/00
[52] U.S. Cl. ...................... 156/174; 156/193; 156/195; 242/471
[58] Field of Search .................... 156/174, 193, 156/195; 242/471

[56] References Cited

U.S. PATENT DOCUMENTS

| | | | |
|---|---|---|---|
| Re. 31,129 | 1/1983 | Rasmussen | 156/193 |
| 3,013,921 | 12/1961 | Jacobson | 156/193 |
| 3,031,357 | 4/1962 | Balkin et al. | 156/193 |
| 3,032,099 | 5/1962 | Croxen | 160/168.1 |
| 3,157,545 | 11/1964 | Waldron et al. | 156/193 |
| 3,384,519 | 5/1968 | Froget | 156/65 |
| 3,822,166 | 7/1974 | Anderson | 156/195 |
| 3,963,549 | 6/1976 | Rasmussen | 156/193 |
| 4,019,554 | 4/1977 | Rasmussen | 428/116 |
| 4,288,485 | 9/1981 | Suominen | 156/193 |
| 4,450,027 | 5/1984 | Colson | 156/193 |
| 4,625,786 | 12/1986 | Carter et al. | 428/116 |
| 4,631,217 | 12/1986 | Anderson | 428/118 |
| 4,676,855 | 6/1987 | Anderson | 156/193 |
| 4,685,986 | 8/1987 | Anderson | 156/197 |
| 4,732,630 | 3/1988 | Schnebly | 156/193 |
| 4,885,190 | 12/1989 | Schnebly | 156/197 |
| 5,043,038 | 8/1991 | Colson | 156/193 |
| 5,043,039 | 8/1991 | Swiszcz | 156/197 |
| 5,287,908 | 2/1994 | Hoffmann et al. | 160/121.1 |
| 5,296,061 | 3/1994 | Ando et al. | 156/193 |
| 5,313,999 | 5/1994 | Colson et al. | 160/121.1 |
| 5,320,154 | 6/1994 | Colson et al. | 160/121.1 |
| 5,339,882 | 8/1994 | Judkins | 160/84.1 |
| 5,394,922 | 3/1995 | Colson et al. | 160/121.1 |
| 5,455,098 | 10/1995 | Cheng | 156/193 |
| 5,456,304 | 10/1995 | Colson et al. | 160/121.1 |
| 5,490,553 | 2/1996 | Colson et al. | 160/84.06 |
| 5,603,369 | 2/1997 | Colson et al. | 160/84.06 |
| 5,638,880 | 6/1997 | Colson et al. | 160/84.01 |
| 5,664,613 | 9/1997 | Jelic | 160/84.05 |

FOREIGN PATENT DOCUMENTS

| | | |
|---|---|---|
| 0 692 602 A1 | 1/1996 | European Pat. Off. . |
| 1521488 | 3/1968 | France . |
| 2840023 | 3/1980 | Germany . |
| 2936811 | 4/1981 | Germany . |

*Primary Examiner*—Deborah Jones
*Assistant Examiner*—Robert R. Koehler
*Attorney, Agent, or Firm*—Rader, Fishman & Grauer PLLC

[57] ABSTRACT

A method of making a fabric Venetian blind comprises helical winding of a narrow, elongated strip, which, when properly overlapped and bonded along longitudinal glue lines, will form the vanes and front and rear facings of the blind. The strips may be formed of a single, uniform material, or of adjacent, longitudinally extending portions of relatively opaque and relatively translucent fabric. An alternative embodiment uses the same winding technique to similarly form a structure of only translucent fabric, but with pockets for subsequent insertion of opaque vanes. The disclosed method and structure may also be used to form products for other applications.

16 Claims, 8 Drawing Sheets

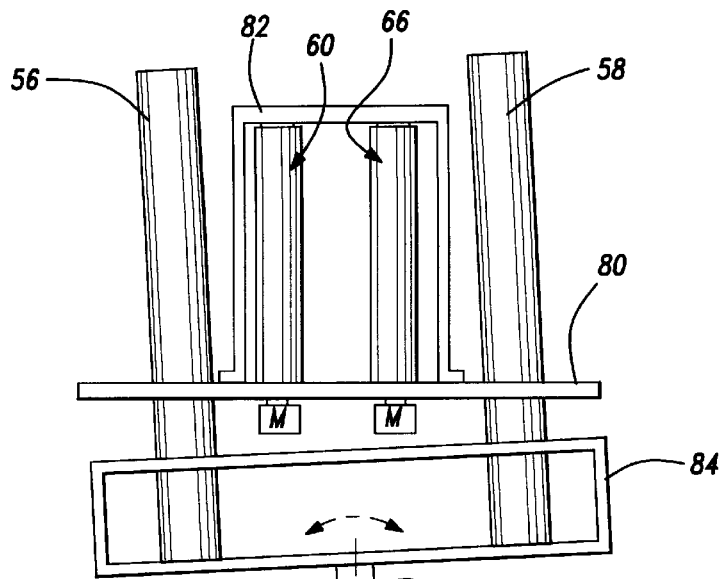
Fig-11
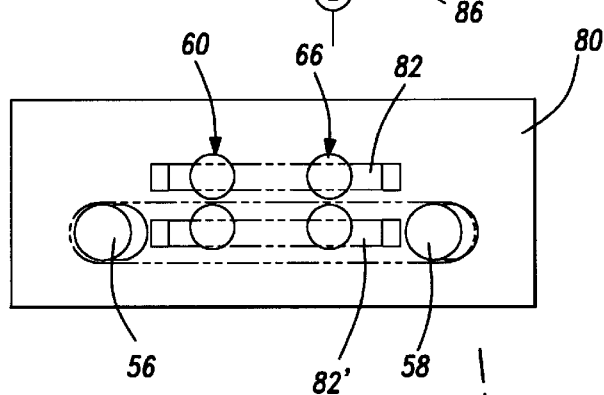
Fig-12
Fig-13
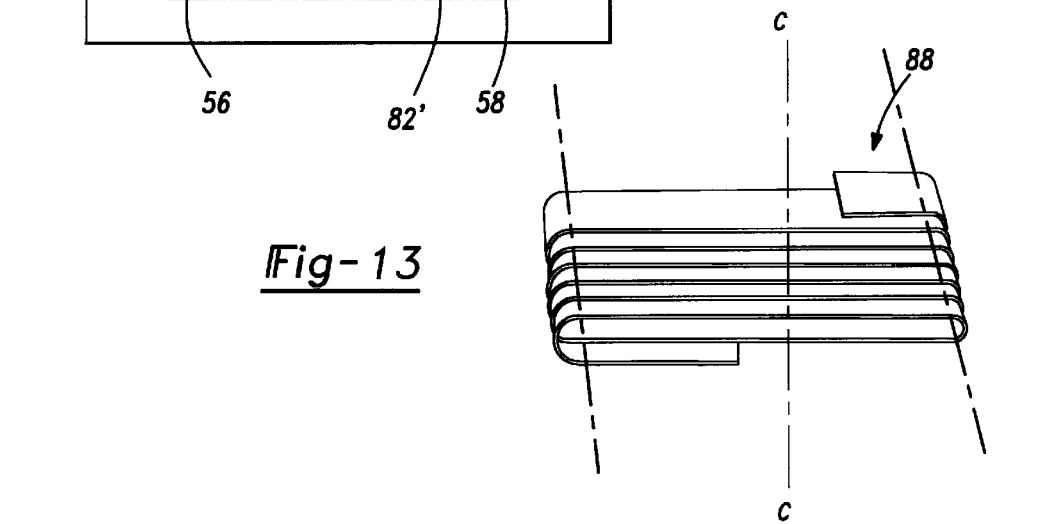
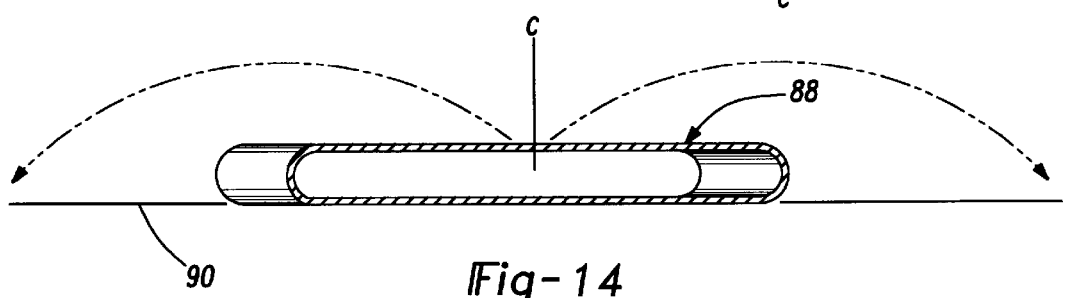
Fig-14

FABRIC VENETIAN BLIND AND METHOD OF FABRICATION

FIELD OF INVENTION

This invention relates to window coverings, and more particularly to the field of Venetian blinds having front and rear panels of sheer or translucent fabric between which are arrayed a series of relatively opaque fabric slats or vanes which can be tilted for light control by means of limited rotation of a wind-up roll to which the front and rear panels are connected. The invention includes an improved technique for fabricating such blinds, which technique can also be applied to forming multi-layered composite sheets used in other types of products and for other purposes.

BACKGROUND OF THE INVENTION

The most familiar type of Venetian blind window covering comprises a series of rigid slats or vanes suspended and controlled by a ladder cord system. The slats are typically wood, plastic or metal, and rest on the ladder cord rungs. The rungs are secured to front and rear vertical cords whose upper ends are secured to circumferentially spaced locations on a wheel. Limited rotation of the wheel, by means of a control wand or cords, causes relative motion between the front and rear cords, which in turn tilts the rungs and vanes. The entire array can be raised and lowered by additional cords which act to lift a bottom rail.

A modified type of Venetian blind is disclosed in U.S. Pat. No. 3,384,519 to Froget. There, the ladder cord system is replaced by front and rear cloth panels to which the vanes are heat welded. Preferably, the cloth panels and vanes are all made of thermoplastic yarns, to facilitate bonding by heat welding. Partial rotation of an upper drum, to which the panels are connected, shifts the panels relative to each other, thereby causing the vanes to tilt for light control.

Several more recent patents are directed to modifications of Froget's basic idea, wherein the vanes are made of flexible fabric, adhesively bonded to the front and back panels. Additionally, the entire array can be retracted from the window opening by winding it onto an upper wind-up roller by means of cords which lift a bottom rail. Representative of these patents are U.S. Pat. Nos. 5,287,908, 5,313,999, 5,320,154, 5,394,922 and 5,456,304, all assigned to Hunter Douglas, Inc., and a patent to Ren Judkins U.S. Pat. No. 5,339,882.

U.S. Pat. No. 5,664,613 (and subsequently assigned to a company owned by the assignee of the present application) describes another form of construction for a fabric Venetian blind. A continuous panel of relatively translucent material forms one facing of the blind. To that panel is bonded a series of parallel fabric strips at uniform intervals. Each strip comprises two adjacent portions of dissimilar material, one being relatively translucent and the other relatively opaque. The free edge of the opaque portion is bonded to the facing panel, while the free edge of the translucent portion is bonded to the adjacent strip at the junction line of that strip's two portions. The assembled translucent portions of the constituent strips become the second facing panel of the completed blind. That is, the second facing panel, rather than being a single continuous panel of fabric, is a composite of several parallel strips, each having a height dimension approximately equal to the width (or depth) of the vanes.

U.S. Pat. Nos. 5,490,553 and 5,603,369, assigned to Hunter Douglas, disclose in FIGS. 16–19 a vertical blind wherein each vertical blind vane is formed of the same strip of material as an adjoining portion of a facing panel on one side of the vanes. The single facing is a composite of narrow vertical strips. The vane portion of this strip is doubled back on itself. Another patent assigned to Hunter Douglas, U.S. Pat. No. 5,638,880, discloses in FIG. 26 a vertical blind wherein the facing on one side of the vanes comprises a series of vertical strips of material, each joined along one vertical edge to an adjacent strip, and at the other vertical edge to both the adjacent facing strip on that side and a discrete piece of substantially rigid, planar material forming the vane. The patent further discloses that both a front and a rear facing may be fabricated of such strips, and the strips and vanes can be oriented in either the vertical or horizontal directions.

U.S. Pat. No. 4,631,217, also assigned to Hunter Douglas, discloses in FIG. 2 a honeycomb or cellular type of window covering wherein a series of pleated, generally Z-shaped strips, each formed of a single piece of fabric, are bonded together in a manner whereby each strip forms the front portion of one cell, the rear portion of an adjacent cell, and a dividing wall between the two cells. The dividing walls, however, are incapable of functioning as the vanes of a Venetian blind type of product, because they remain substantially perpendicular to the front and rear faces of the window covering throughout the full range of expansion and collapse of the cells.

Known processes for manufacturing these prior art fabric Venetian blinds are complex, slow and costly, and have contributed to a high price for these otherwise attractive products.

Accordingly, it is a principal object of the present invention to develop a simplified and more economical method for manufacturing fabric type Venetian blinds, using smaller and less costly equipment, allowing fully continuous processing, and resulting in a more uniform and high quality finished product.

SUMMARY OF THE INVENTION

The presently contemplated application for the disclosed invention is the formation of fabric Venetian blinds, using a technique of helically winding an elongated strip of fabric. In the preferred embodiment of the Venetian blind, a three-portion strip is initially formed from three side-by-side, longitudinal, bands or portions of approximately equal width and length. Each edge of the central portion is joined by ultrasonic welding to an edge of the adjacent outer portion. The outer portions are formed of sheer or relatively transparent material, and the central portion is relatively opaque.

As a result of the helical winding process, the central portion becomes the blind vane, while the two outer portions ultimately become segments of the front and rear composite facings of the blind. Successive windings are staggered and partially overlapped so that two of the three portions of the underlying winding are covered by the overlying winding. Two longitudinally extending glue lines are applied along the underside of the infeeding overlapping strip, these being positioned to bond together adjacent windings. A tube-like wound structure is formed which, when cut open along a line perpendicular to the helix angle, will result in a fabric Venetian blind.

The strips, once assembled by the winding operation, produce both the flexible vanes and the front and rear face panels in a single continuous process. The resulting composite face panels comprise narrow, horizontal strips which have been joined successively to one another in the winding operation. The resulting flexible vanes swing between light-admitting and light-blocking positions upon relative movement between the two composite face panels. The disclosed product thus differs significantly, both in construction and method of fabrication, from the prior art Indeed, the unique product and its benefits could not so economically be achieved by known manufacturing processes.

Alternative constructions may include an additional layer of fabric in the vane portion, to create a pocket into which an opaque insert can subsequently be inserted, and the formation of products having multiple rows of vanes or central ligaments.

The novel winding technique disclosed herein may also be used to fabricate products from other tapes of materials or intended for other fields of use. For example, multi-layered materials made from thermally nonconductive or reflective material may be made for insulation applications; polarized or tinted films may be used to create desired optical effects; and materials of selected porosity may be used to form air filtration products.

Also disclosed is the use of a resiliently deformable circumferential surface on a nip roll which functions to steer the sheet-like material which is driven by the roll set when differential pressure is applied to the two ends of the deformable roll.

BRIEF DESCRIPTION OF THE DRAWINGS

FIG. 11 is a simplified plan view of the equipment of FIG. 9, showing the supporting framework.

FIG. 12 is a simplified side elevational view of the equipment of FIG. 11.

FIG. 13 is a perspective view of a helically wound tube of blind material, prior to being cut open, viewed from the opposite end of the spars from the end shown in FIG. 9.

FIG. 14 is a schematic end view, in the direction of the cutting plane C—C, of the helically wound tube showing how it is cut open to form a fall-width fabric Venetian blind.

DETAILED DESCRIPTION OF PREFERRED EMBODIMENT

Figure 2:
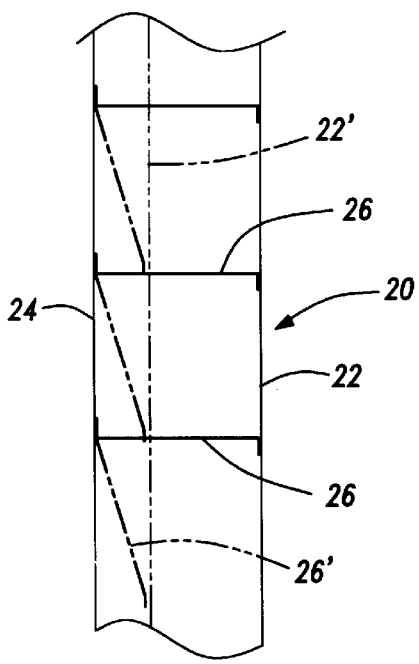
FIG. 2 is a side view, in simplified form, of a representative prior art fabric Venetian blind, wherein the vanes are joined to single, continuous-sheet type front and rear sheer panels. The blind is shown in the fully-open position of the vanes, while a partially closed position is shown in phantom lines.
Figure 3:
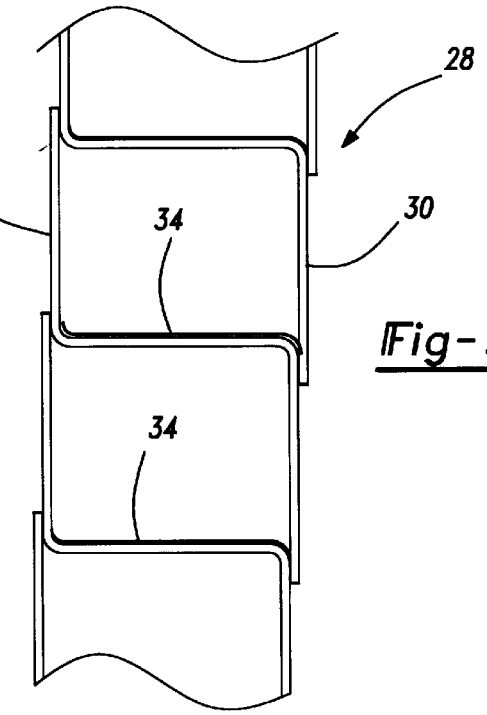
FIG. 3 is an enlarged fragmentary side view of the blind of FIG. 1A.

FIG. 2 of the drawings shows a fabric Venetian blind 20 which, in its general construction, is typical of the prior art. The solid lines indicate the fully-open position of the vanes. The blind comprises a front facing 22, rear facing 24 and vanes or slats 26. The front and rear facings are each typically formed of a continuous panel of sheer material, chosen for its combination of soft, aesthetic appeal, its ability to permit a substantial amount of light to be transmitted when the vanes are in their open position, and, depending upon the selected weave, its ability to permit viewing of scenes through the material. The vanes are bonded along their respective longitudinal edges to the front and rear facings. Bonding can be by adhesive or thermal welding. When the wind-up roller from which the blind is suspended is rotated slightly, the front and rear facings shift in a vertical direction relative to each other, causing the angle of the vanes to change. A position near the fully-closed setting of the vanes is shown in phantom in FIG. 2, with the elements labeled with primed numerals.

Figure 1A:
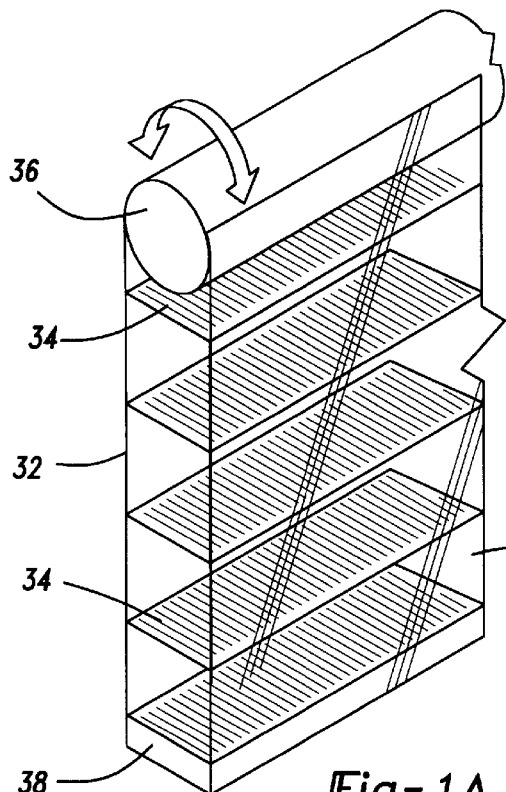
FIG. 1A is a simplified perspective view of the fabric Venetian blind of the present invention, shown with the vanes positioned in their maximum light-admitting setting.
Figure 1B:
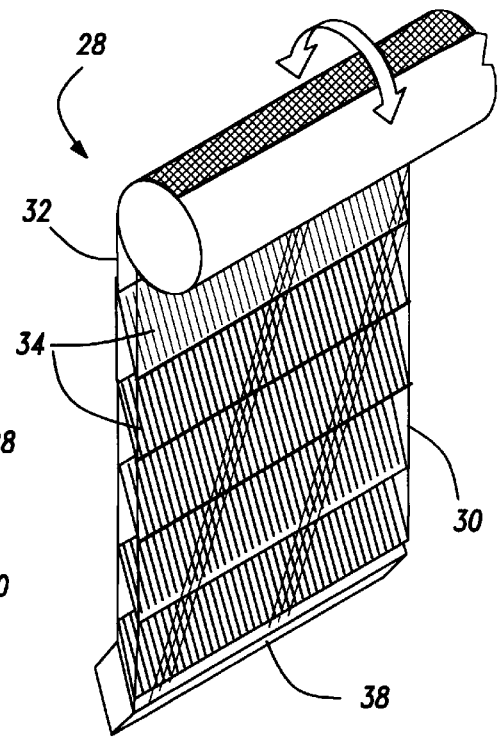
FIG. 1B is a view similar to FIG. 1A, showing the vanes positioned in a partially closed setting.

FIGS. 1A and 1B show, in simplified form, the basic elements of a complete fabric Venetian blind assembly 28 in full-open and near-closed conditions, respectively. The blind comprises front and rear sheer or relatively translucent facings 30,32, respectively, a plurality of relatively opaque vanes 34, a wind-up roller 36 and a bottom rail 38. Not shown are the cords or other means for rotating roller 36 to adjust the vane angle and to roll the shade around the roller to fully expose all or a portion of the window opening.

Comparing FIGS. 1A and 1B it can be seen how the points of attachment of the front and rear facings to opposite sides of the circumference of the roller result in relative vertical movement of the facings, and therefore adjustment of the vane angle, when the roller is rotated slightly.

Figure 5:
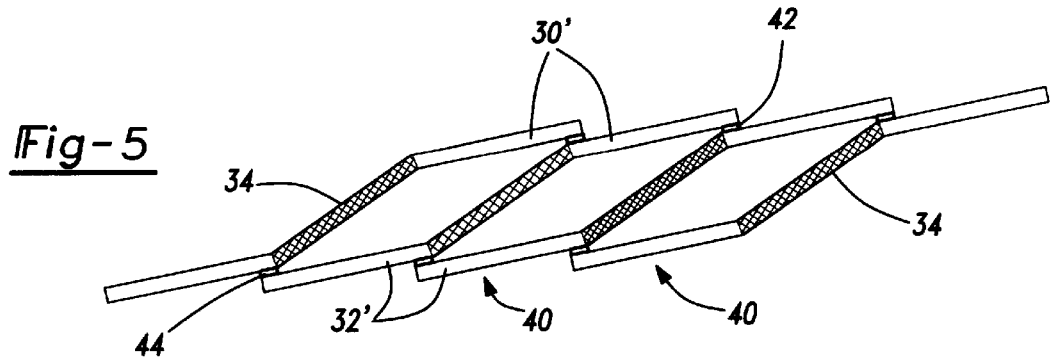
FIG. 5 is an enlarged, simplified view of the blind of FIG. 3, with the vertical scale exaggerated to reveal the relationship of adjacent three-portion strips.
Figure 4:
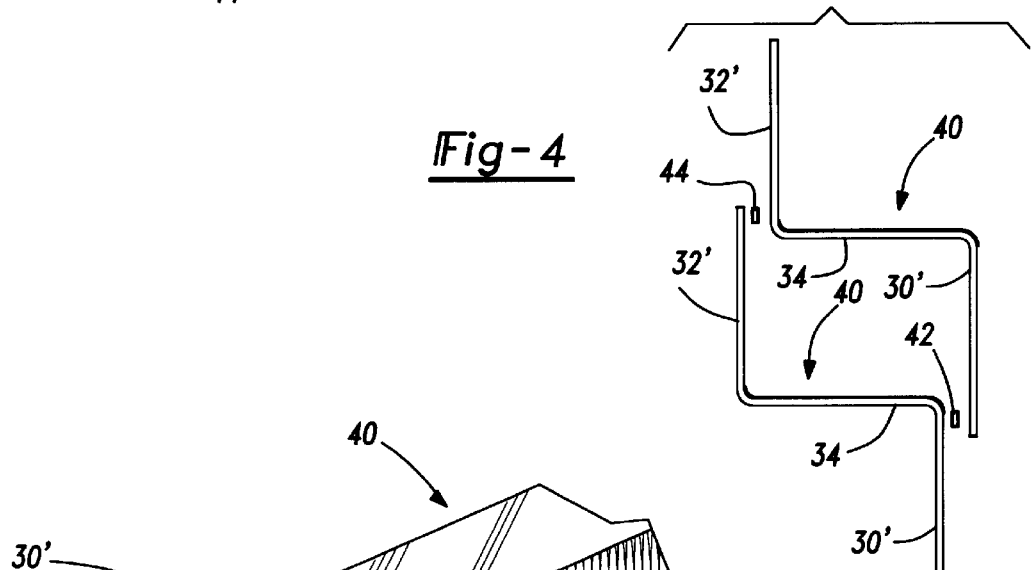
FIG. 4 is an exploded schematic view of the blind of FIG. 3, showing the relationship of adjacent three-portion strips.
Figure 6:
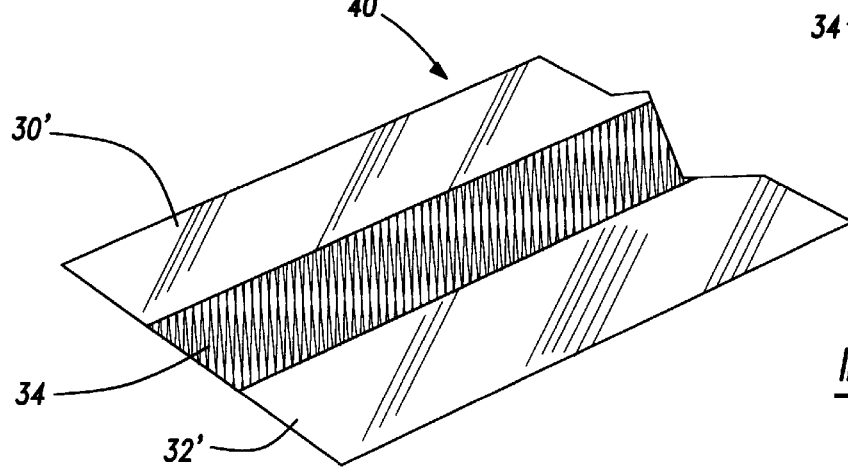
FIG. 6 is a perspective view of a fragment of a three-portion strip such as used in the embodiments of FIGS. 4 and 5.

FIGS. 3–14 all illustrate the novel structural aspects and fabricating process of the present invention. The preferred embodiment is best shown in FIGS. 4–6. Fabrication begins with the creation of an elongated strip 40 (see FIG. 6) comprising at least two dissimilar fabric materials. The outer portions 30',32' are formed of relatively translucent or sheer material, while central portion 34 is formed of a relatively opaque material. Outer portions 30',32' may be formed of the same or different fabrics. The central portion can be opacified by use of a more densely woven fabric, or by coating or laminating (see discussion of FIGS. 7 and 8 below) or by the use of opaque inserts (see discussion of FIG. 18 below). The adjoining edges of these portions may be connected by gluing, ultrasonic welding, thermal bonding or stitching. Ultrasonic welding is the preferred method, because it is speedy and permits precision location of adjoining edges.

This process also beneficially compresses the welded zone and destroys the fabric interstices, so that the joint will not be porous to subsequently applied glue lines. Thus, unsightly bleed-through of the glue lines is avoided. The width of strip 40 is approximately three times the desired vane width (i.e., blind thickness in the fully open setting of the vanes).

Unlike known processes of the prior art, the fabric Venetian blind of the present invention is generated by helically winding the strip upon itself, in partially overlapping fashion, with each winding being bonded to the preceding winding along uniformly located longitudinal bonding lines. The result is that each winding of strip material 40 constitutes one vane and an adjacent fragment of each of the front and rear facings of the completed fabric Venetian blind.

The relationship of adjacent windings of strips 40 is best seen in FIGS. 4 and 5. Each strip winding 40 overlaps approximately two-thirds of the preceding strip winding. Specifically, the leading edge (i.e., the right edge as viewed in FIG. 6) of a winding is placed at or near the sheer/opaque junction of the preceding winding. A previously applied front glue line 42 is located on the underside of the upper strip at that contact line, while a previously applied rear glue line 44 is located at the underside of the upper strip at or near the junction between the rear sheer portion 32' and the opacified vane portion 34. That rear glue line 44 will then join such strip to the trailing edge of the previously wound or lower strip 40.

The choice of location of glue lines 42 and 44 relative to the junctions between the sheer and opaque portions of each winding is not critical. The opaque portions need not fully span the distance between the front and rear facings, as long as the opaque portions overlap when the blind is in the fully closed position. Glue lines 42 and 44 may be spaced from the edges of the strips, if desired, as when a series of unsupported, fringe-like bands are desired on one or both of the facing panels.

The method and apparatus for performing the winding steps are described below.

Figure 7:
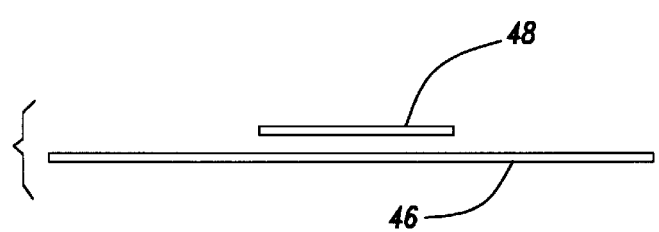
FIG. 7 is an exploded end view of a second form of the three-portion strip.
Figure 8:
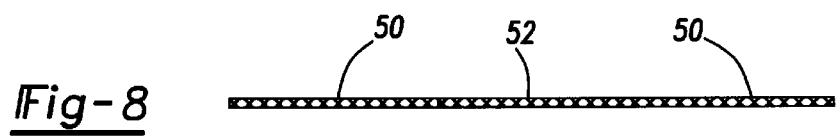
FIG. 8 is a view similar to FIG. 7, showing a third form of three-portion strip.

Alternative forms of the three-portion strip 40 are shown in FIGS. 7 and 8. In FIG. 7, the strip is formed of a full-width relatively translucent portion 46, with a relatively opaque central portion 48 laminated to it by any of the previously described joining techniques. This embodiment is not preferred, because it tends to be too stiff to hang uniformly. In the FIG. 8 embodiment, the three-portion strip is formed of a single piece of fabric, but with less dense weaving patterns being used for the outer portions 50, and a more dense or opaque weaving pattern being used for the central portion 52 which will become the vane of the finished blind. The embodiments of FIGS. 6 and 8 are preferred, because they tend to hang in a more uniform, wrinkle-free manner.

The method and equipment employed for fabricating the preferred embodiment is illustrated in FIGS. 9–12 of the drawings. The manufacturing equipment includes a pair of parallel, non-rotating spars 56,58 skewed at an angle to two parallel nip roll sets. The first nip roll set 60 serves to drive the fabric by tensioning the upper reach of fabric tube 88. Nip roll set 60 comprises a lower, motor-driven roll 62 and an upper, pressure roll 64. The second nip roll set 66 serves to provide tensioning drag and to steer fabric tube 88. It comprises a lower, motor-driven roll 68 (which is driven in a manner to tension or brake the span of fabric between it and drive nip roll set 60) and an upper, steering pressure roll 70. The steering action is described below. Rolls 62 and 68 may be driven by belt-driven sprockets (not shown).

The three-portion fabric strip 40 is fed from strip supply roll 72, which has its own drive motor M which drives roll 72 at a speed controlled by the position of dancer 73. If the strip loop around dancer 73 gets smaller, the motor driving roll 72 speeds up to maintain a uniform amount of strip in that portion of the strip feed system. Strip 40 continues from dancer 73 through a nip roll set comprising upper roll 74 and lower motor-driven roll 75 to tension-sensing roll 76, which is provided with a load cell on its axle. This load cell senses tension in the strip between rolls 76 and 64, and adjusts the speed of motor M associated with nip roll 75 to maintain the desired tension in that portion of the in-feeding strip.

Two adjacent glue applicators 78 apply continuous beads of glue 42,44 to strip 40.

The support structure for the two pairs of nip rolls 60,66 comprises main mounting plate 80 (see FIGS. 11–12) and end plate 82 connected thereto by cantilevered beams. End plate 82 supports the end of upper rolls 64,70 remote from main plate 80, while lower rolls 62, 68 are supported by similar cantilevered beams and end plate 82'. These end plates must be supported in this fashion so that no support structure crosses from inside to outside the fabric loop or tube 88 defined by spars 56, 58. Spars 56,58 are cantilevered from a separate frame structure 84, which can be pivoted about vertical axle 86 to permit the spars to be set at a predetermined angle relative to the two nip roll sets. This angle is a function of the desired lead angle for the helical winding of strip 40, as will be explained below. Appropriate clearance holes are placed in frame 84 to permit passage of spars 56,58. The end of cantilevered spars remote from mounting frame 84 is free of connection to supporting structure to permit removal of the continuously formed fabric tube therefrom and to allow adjustment of the spar angle relative to the lower rolls. Alternatively, if spar angle adjustment were deemed unnecessary, the ends of the spars could be attached to the lower roll support or to any other structure lying entirely within fabric loop 88.

Figure 9:
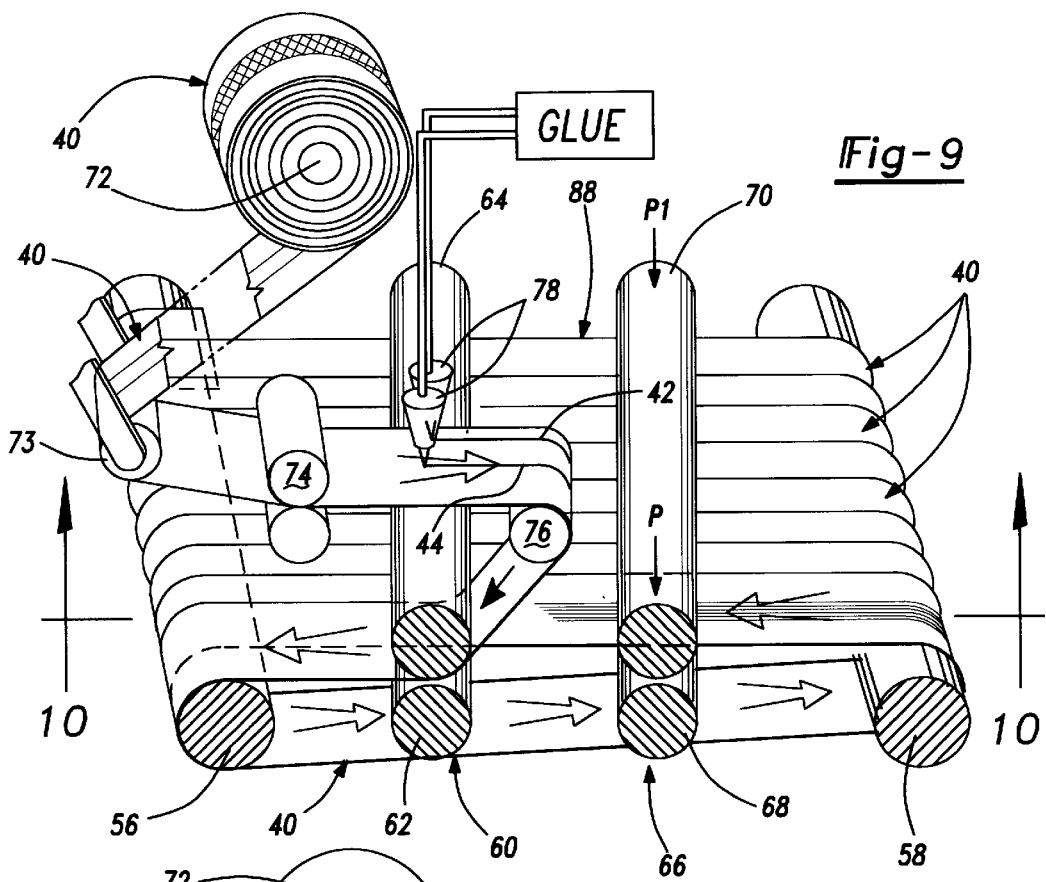
FIG. 9 is a simplified perspective view of equipment suitable for forming a blind using the process of the present invention.
Figure 10:
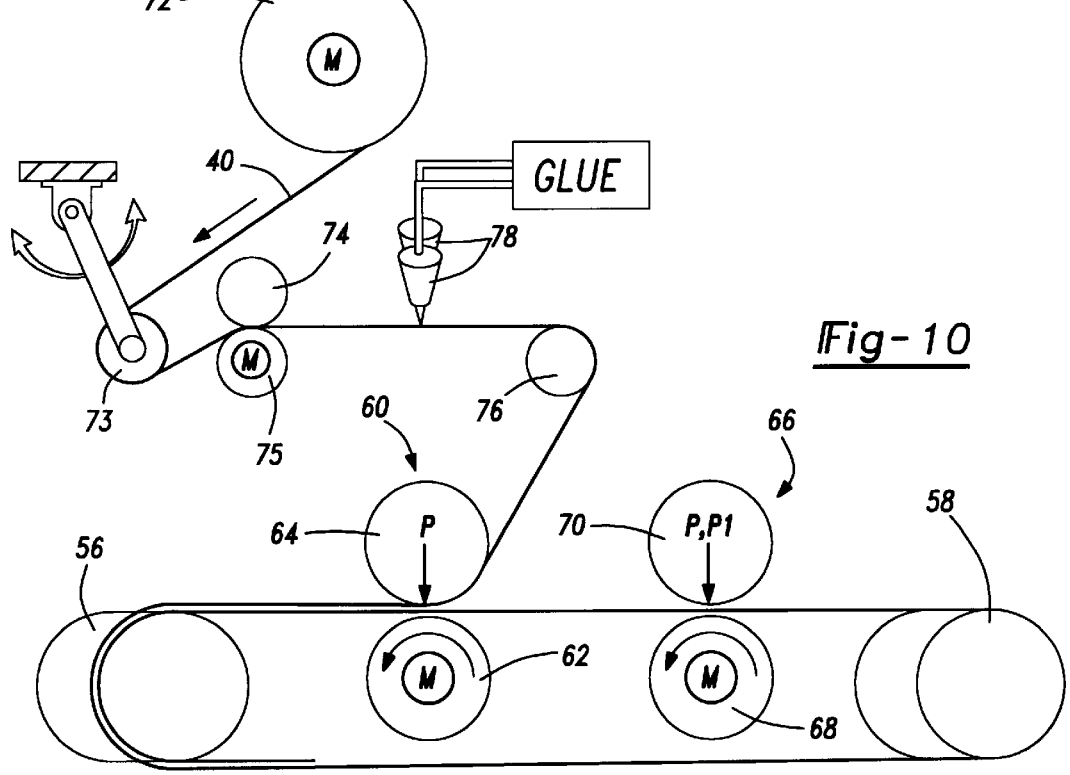
FIG. 10 is a schematic side elevational diagram of the equipment shown in FIG. 9.

As best shown in FIG. 9, the process begins with the three-portion fabric strip 40 being pulled from supply roll 72 by drive nip roll set 74–75. Controlled feed rate of the strip between supply roll 72 and nip roll set 60 is provided by motor-controlling signals from dancer 73. Constant tension in the strip between nip roll set 74–75 and drive nip set 60 is provided by motor-controlling signals from tension-sensing roll 76, as explained above. The strip is directed past glue applicators 78, and the upper, glue line-bearing side of the strip is inverted by roller 76 so that such glue lines come face-to-face with the preceding winding between the rolls of nip roll set 60. There, the glue joint is closed and the overlapping windings are bonded to each other.

As will be appreciated by reference to FIG. 5, the infeeding strip 40, with glue lines 42, 44 already applied by applicators 78, must precisely register with the preceding winding traveling on the upper reach of the fabric loop extending from spar 58, through drag nip roll set 66 to drive nip roll set 60, where infeeding strip 40 first comes into contact with the preceding winding for bonding. FIG. 9 shows how the skewing of spar 56 causes the lower reach of the endmost fabric strip winding to shift laterally as it travels to spar 58 and back to the point between the rolls of drive nip roll set 60 where the incoming strip, with freshly applied glue strips 42,44 on its underside, is pressed against it. The lateral shift, a result of the helix lead angle, is selected to cause a shift of approximately one-third of the width of strip 40, so that glue lines 42,44 will register with the previous winding as shown in FIG. 5. Thus, the required relative positioning of the relatively opaque vane portion 34 with the relatively translucent facing portions 30',32' will be achieved when the vanes of the finished blind are placed in their light-blocking or fully closed angular setting.

Precise control of the amount of overlap between successive windings is provided by two independent controllers. First, the lateral position of infeeding strip 40 from supply roll 72 is provided by a controller (not shown), or other known web guiding device, which laterally shifts the placement of roll 72 along its rotational axis.

Secondly, additional control of registration of the overlapping windings of strip 40 is provided by drag nip roll set 66, which has a "steering" capability. Both pressure rolls 64 and 70 are rubber-coated, to provide a compressible surface. Unlike pressure roll 64 of drive nip roll set 60, which has a constant force pressing it downward toward drive roll 62, steering pressure roll 70 has independently controllable downward pressure (described below) applied at its opposite ends. When the applied pressures are equal at both ends of roll 70, the roll has a strip-contact zone of uniform width along its entire length, where the rubber roll is deformed about the unyielding surface of roll 68. The passing fabric strip does not deviate from its straight-line path, and continues to take the shortest route from spar 58 to nip roll set 60. An increase in the nip pressure at one end of roll 70 increases the concavity of its rubber-coated surface as it is deformed by the cylindrical contour of the non-yielding surface of lower roll 68. The path of the fabric strip at that end of the roll lengthens as it is forced to assume the longer curved shape of the further deformed surface of roll 70. That is, the strip-contact zone (at that end) between the opposed rolls of nip roll set 66 increases to a greater segment of an arc about the rigid roll's surface resulting from the extra deformation of the surface of roll 70 straddling a lengthened portion of the perimeter of lower roll 68. The resulting longer strip path on the edge with increased steering pressure creates increased strip tension on that edge, pulling or steering the fabric toward that edge. Reducing pressure at one end similarly reduces the path there relative to the nominal condition, drawing the web toward its other edge.

Figure 15:
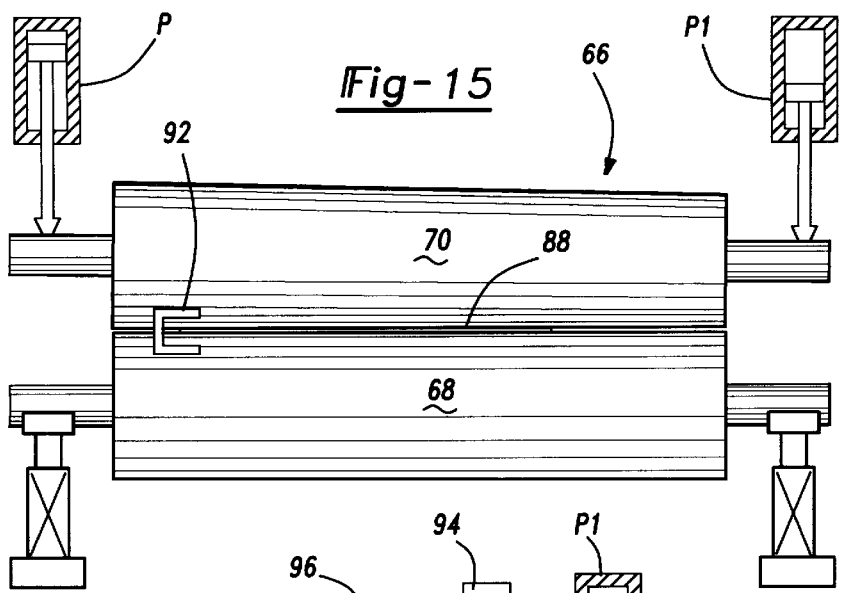
FIG. 15 is a schematic elevational view of nip roll set 66.
Figure 16:
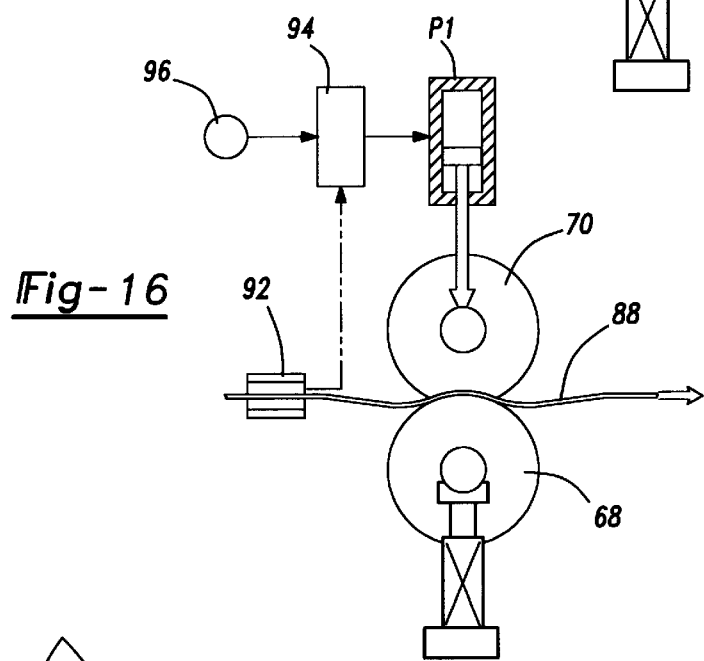
FIG. 16 is an end view of the nip roll set of FIG. 15.
Figure 17:
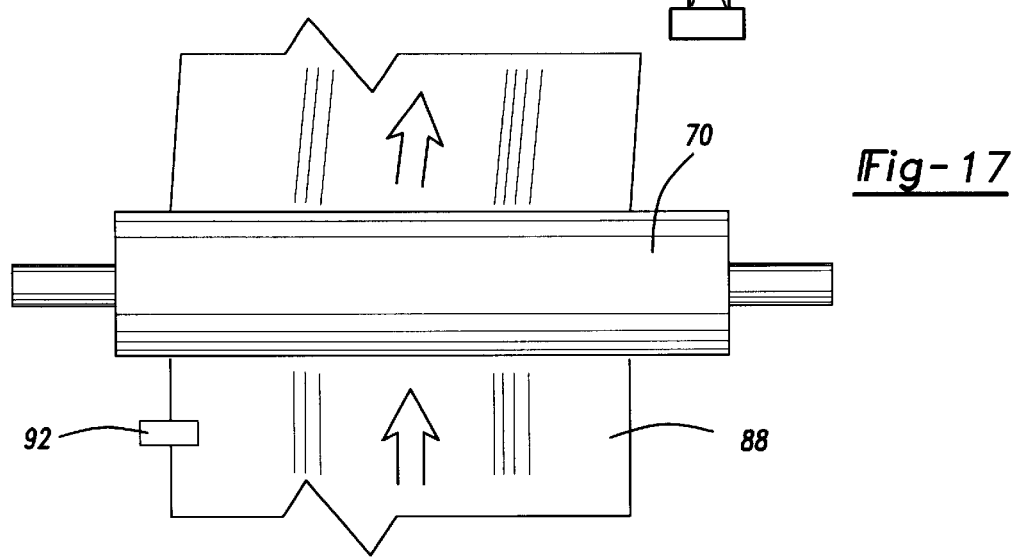
FIG. 17 is a plan view of the nip roll set of FIG. 15.

FIGS. 15–17 schematically illustrate a steering control system for varying the pneumatic pressure applied to cylinder P1 on one end of pressure roll 70. That end of pressure roll 70 is mounted in vertically slideable bearings. The control signal is provided by a proportional voltage output device in the form of an edge-position sensor 92, which may be in the form of a linear array of light-emitting outputs and photocells on opposite sides of the plane of the passing fabrics. Any deviation from the desired edge position of the strip generates a corresponding deviation from a nominal pressure-demand voltage signal sent by sensor 92 to control computer/proportional regulating valve 94. Valve 94 bleeds or supplies air pressure from source 96 as required to maintain a desired cylinder pressure defined by the voltage signal. The resulting tilting and deformation of roll 70 is shown in exaggerated form in FIGS. 18–19, and the corrected path of the upper reach of fabric tube 88 is shown in the plan view of FIG. 17.

While the use of crowned rolls to "steer" a web or flat belt to a central position, and the use of flared-end rollers to spread and de-wrinkle a web, are well known, it is believed that the use of a selectively deformable roller at a nip to steer a web by local control of path length is novel. Those skilled in the art will recognize that steering can be achieved either by varying the pressure on both ends, or maintaining nip pressure constant on one end while increasing or decreasing the pressure on the other end, as required.

Because fabric strip 40 has a helix lead angle as it winds onto spar 56 (which is skewed by such angle relative to drive nip roll set 60), the fabric "tube" 88 continuously advances toward the opposite end of the non-rotating spars. The spars are highly polished to facilitate this sliding movement without damage to the fabric.

The spars are preferably sufficiently long to permit them to hold an entire tube formed from a feed roll. For example, a machine has been built with twelve-foot long spars, for use with a three hundred-yard long feed roll. The spars may be perforated to permit pressurized air to provide an air bearing to reduce the drag of the fabric tube as it advances along the spars. When the machine is shut down to install a fresh feed roll, the tube may be cut off, using a scissors, by first cutting around the circumference of the tube, generally along a given strip. Then, the severed tube, while still hanging on the spars, is cut along a line C—C (see FIGS. 15–16), which is perpendicular to the edge of the windings, so that the tube may be laid open to form a parallel-edged flat form or slab 90 with the wound strips perpendicular to the parallel edges. In the presently constructed machine, this slab is about ten feet wide and about ten or more feet long. The fabric slab is then cut to size for particular windows, and the fabric Venetian blind is fully formed except for its connection to a wind-up roll and associated hardware.

Many different products and visual effects can be achieved by use of the present invention. A basic Venetian blind may preferably be formed of polyester (for strength and UV resistance) knitted mesh front and rear, of different mesh patterns, and a knitted polyester opaque fabric for the vanes. Moisture-cure polyurethane hot-applied glue is preferably used for bonding adjacent windings. This glue cures to a permanent rubber-like state in moist air. Alternatively, other knits, wovens or nonwovens may be used for either the facings or vanes, and hot-melts, pressure sensitives, tapes or other adhesives may also be used, provided they possess UV resistance, non-yellowing and strength with no flow at up to 200 degrees Fahrenheit for durability in sunlit windows.

Another alternative Venetian blind product which may be formed by this helical winding technique would use fabric of uniform light-transmitting ability throughout. That is, instead of a three-segment strip of varying opacity, the winding strip could be made of a single, ultralight, non-woven fabric. In the "open" position, light would be filtered through two layers (the front and rear composite facings), while in the partially and fully closed positions, it would be further filtered through the vane layer of fabric, causing an additional fifty percent diminution in the light transmission through the blind. If angle-dependent polarizing material were used, further control of the light transmission could be obtained.

Because this helical winding process permits use of narrow strips of material to form the composite facing panels, the face panels can be formed of lace material. Heretofore, continuous sheet facing panels were too wide to permit lace to be used at an acceptable price. Also, it would be difficult to match the pitch of the finished shade to the repeats of the wide-goods lace. As further alternatives, the vane portion may be a thin wood veneer laminate, or printed cloth with different colors on its opposite sides.

Figure 18:
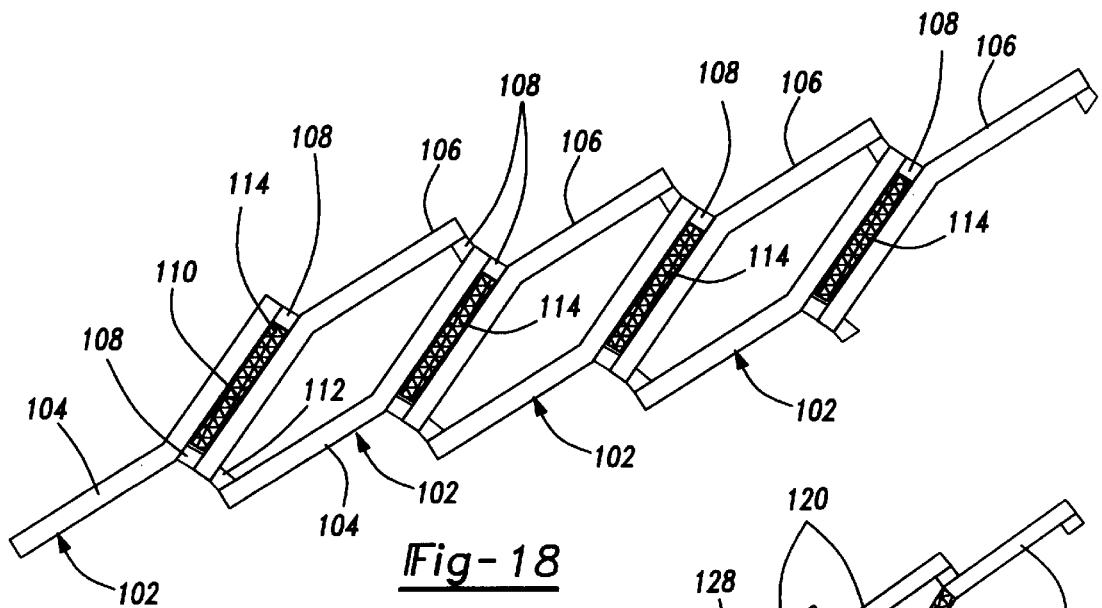
FIG. 18 is a view similar to FIG. 5, showing an alternative embodiment having pockets to receive opaque vane inserts.

The modified embodiment of FIG. 18 is similar to the embodiment of FIG. 5, but employs a different means of opacifying the center or vane portion of each strip. These pocketed strips 102 each comprise overlapping rear and front sheer facings 104, 106, respectively, pre-joined (i.e., prior to winding) by glue lines or ultrasonic junctions 108. The central overlapping thirds and glue lines define an insert-receiving pocket 110. Strips 102 are wound and bonded together at glue lines 112, as in the previously described embodiment of FIGS. 5, 9 and 10. Later, after cutting open the helically wound tube, opaque inserts 114 may be inserted in pockets 110 to provide the desired opaque vanes. As a further alternative, the pocketed strips can have the sense of the overlap reversed. That is, front sheer facing 106 can overlap rear sheer facing 104. Alternatively, the individual facing strips 104, 106 and a continuous strip of opaque insert 114 can be helically wound together by use of multiple feed rolls 72 appropriately positioned to feed with the desired overlaps onto the winder.

Figure 19:
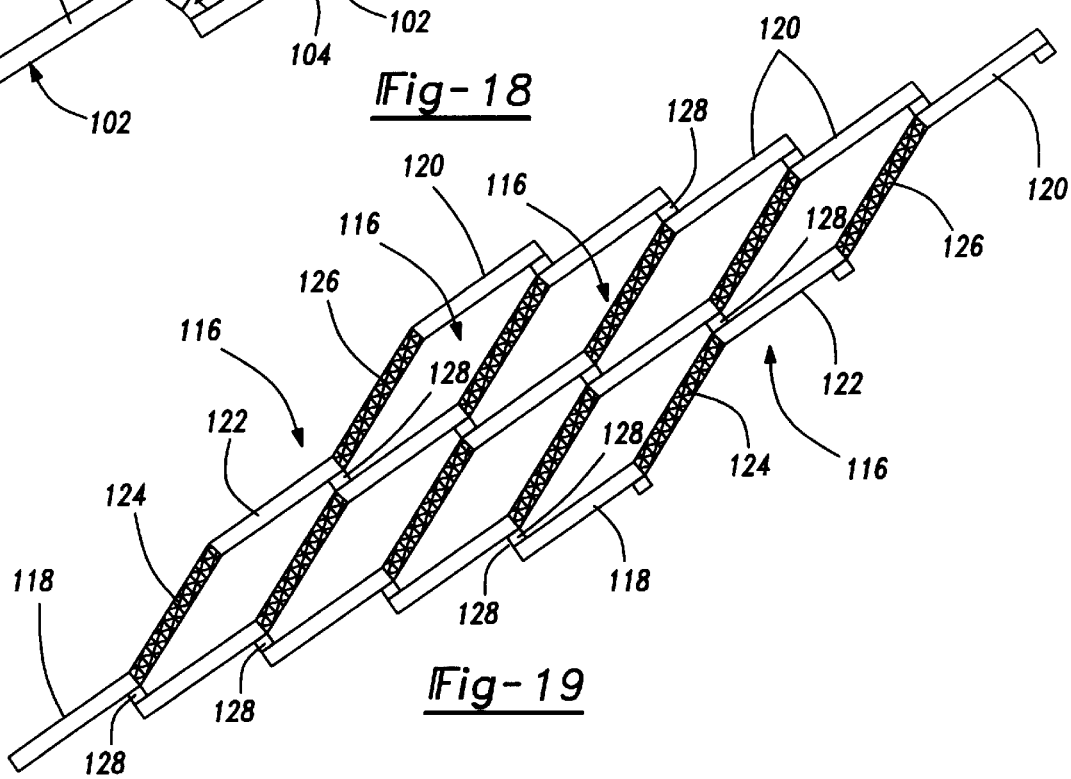
FIG. 19 is a view similar to FIG. 5, showing still another alternative embodiment wherein multiple rows of vanes or central ligaments are provided.

FIG. 19 illustrates an example of a double-deep structure having multiple rows of vanes or central ligaments. Each strip 116 comprises five segments, namely, rear, front and central sheer portions 118, 120, 122, respectively, and first and second opacified portions 124, 126, respectively. Successive strips are helically wound and bonded together at glue lines 128, as previously described. Opacified portions 124, 126 could have different degrees of opacity, so that, depending upon which column of vanes was closed, a light-blocking or a semi-translucent mode could be selected. Alternatively, these two portions could be cross-polarized to provide a choice of opacities. With both vanes fully open, a transparent light path would be provided through the aligned sheer portions 118, 120, 122.

By shortening the length of central ligament or sheer portion 122, it will "go straight" or taut before the front and rear facings, providing uniform pitch for the hanging blind, and allowing the front and rear facing segments 118 and 120 to assume a softer, slightly looped or curving, appearance.

Figure 20:
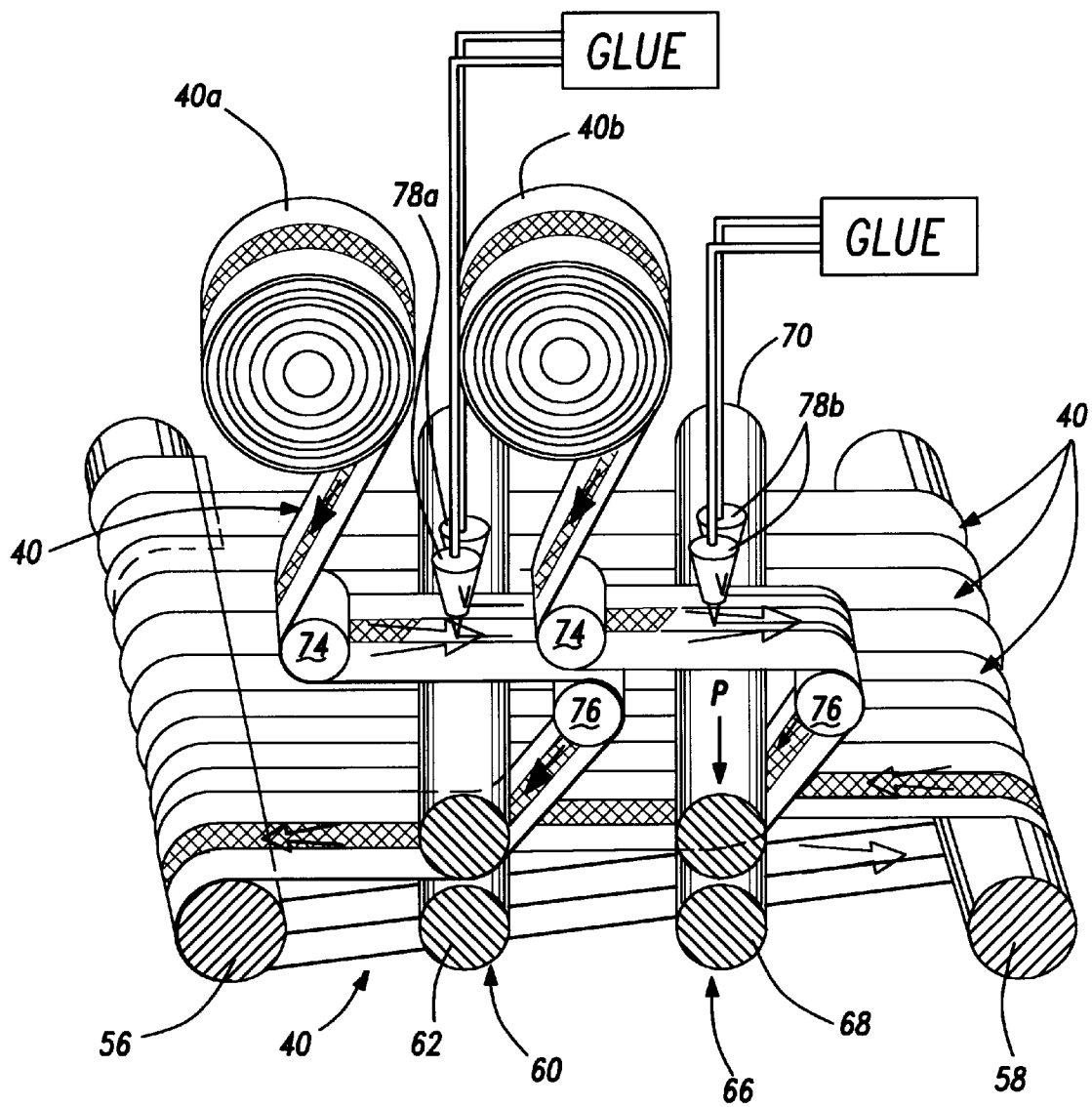
FIG. 20 is a view similar to FIG. 9, showing a modified system for feeding the fabric strip to the winding equipment

In an alternative winding process, a multi-lead winding arrangement can be employed. A first such arrangement, illustrated in FIG. 20, introduces a second distinct preformed three-portion strip 40*b* from a separate supply roll 72. For the simplicity of illustration, dancer 73 has been omitted from this Figure, as well as from the further alternative illustrated in FIG. 21. A similar pair of glue nozzles 78*b* is provided to apply glue stripes to strip 40*b* in the same manner and location as in the case of the primary strip 40*a*. Because the fabric loop or tube 88 is lengthened by two non-overlapping strip portions per revolution, rather than one, the helix lead angle must be doubled. That is, the angle between spars 56, 58 and nip sets 60 and 66 must be doubled.

Figure 21:
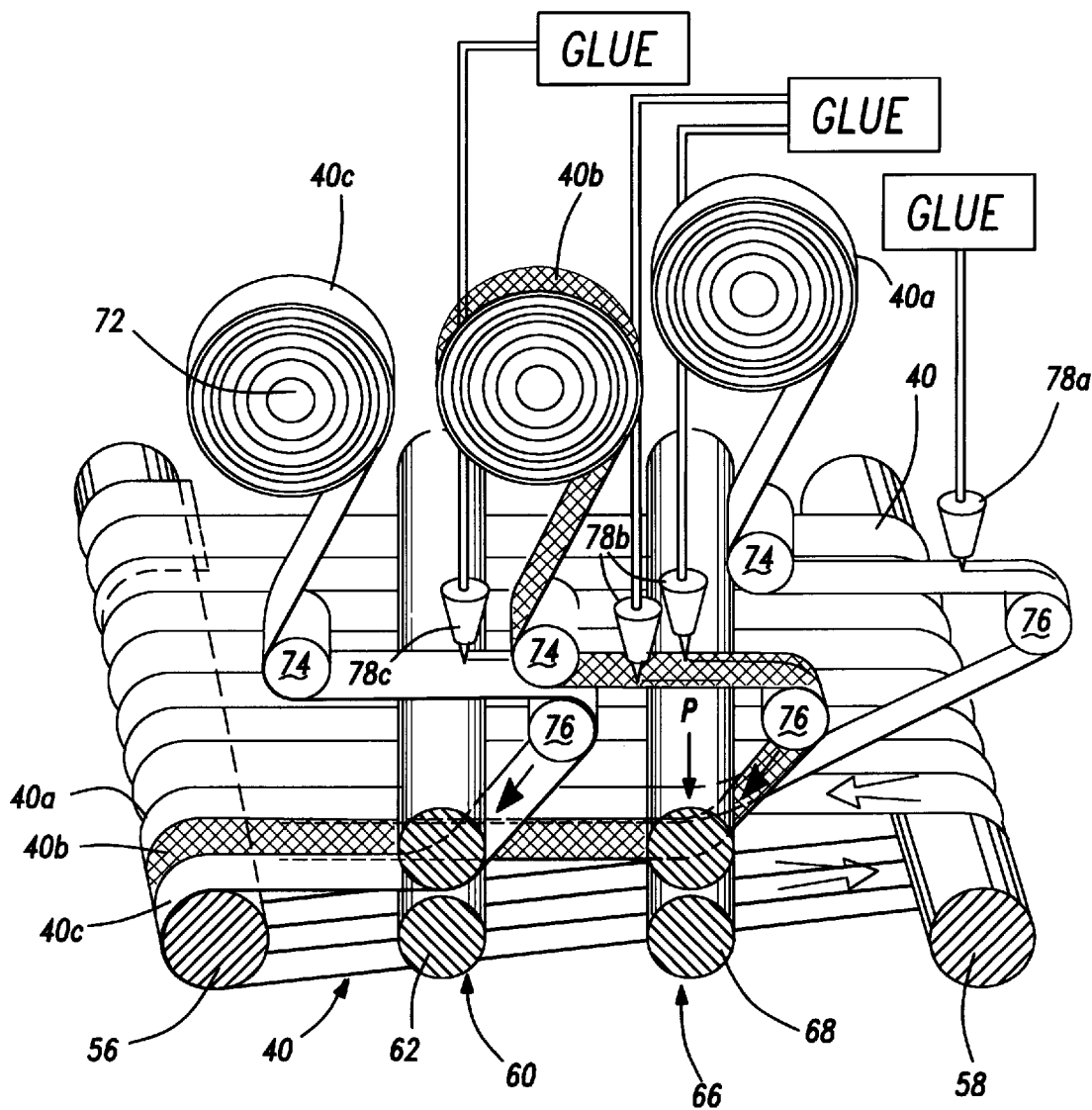
FIG. 21 is a view similar to FIG. 9, showing another modified system for feeding the fabric strip to the winding equipment.

A second multi-feed arrangement is illustrated in FIG. 21. Instead of feeding a pre-formed three-portion strip from supply roll 72, the individual portions of the strip can be fed from separate supply rolls and joined to each other (with minimal overlap) as they are laid upon and joined to the previously applied winding of fabric tube 88. These junctions can be achieved by glue lines or ultrasonic bonding. In FIG. 21, three supply rolls simultaneously feed separate strip portions 40*a*, 40*b* and 40*c*. Only a single glue line (from nozzle 78*a*) is required to secure portion 40*a* to the prior winding or wrap. Similarly, only a single glue line (from nozzle 78*c*) is required to secure central portion 40*c* to adjacent portion 40*b* of the same wrap. However, two widely spaced glue lines (from nozzles 78*b*) are required to join central portion 40*b* to portion 40*a* of the same wrap and to separately join portion 40*b* to portion 40*c* of the prior wrap. Note that two or more strip portions (here, portions 40*a* and 40*b*) can be fed into the fabric loop at the same place, i.e., at nip set 66, with an offset equal to the desired offset per lap or wrap. A strip portion (here, portion 40*c*) can also be fed in at a separate location on the fabric loop, i.e., at nip set 60. As long as the feed-in locations are within the flat portion of the fabric loop 88, the offset remains equal to the desired offset per lap in the finished goods.

This invention may be further developed within the scope of the following claims. Accordingly, the above specification is to be interpreted as illustrative of only a few operative embodiments of the invention, and not in a strictly limiting sense.

I now claim:

1. A method of continuously forming a multi-layered sheet goods product comprising:

helically winding an elongated strip of thin, pliable material upon a supporting surface, with each successive winding partially overlapping the immediately preceding winding to a predetermined extent, said strip having first and second longitudinally extending edges;

bonding each successive winding of material to the immediately preceding winding along a longitudinally extending bonding line whose transverse width is substantially less than the transverse width of said partial overlap, said bonding line located in proximity to said first longitudinally extending edge of said immediately preceding winding and remote from said first and second longitudinally extending edges of said successive winding.

2. The method of claim 1 which comprises the further initial step of forming said strip of at least two parallel, adjoining, longitudinally extending portions of differing fabrics.

3. The method of claim 2 wherein one of said fabric portions is more opaque than another of said fabric portions.

4. The method of claim 3 wherein said bonding line is located in proximity to the junction line between said adjoining portions of said successive winding.

5. The method of claim 1 which includes the further step of cutting open the resulting assembly of multiple windings along a cutting line perpendicular to said longitudinally extending bonding lines.

6. The method of claim 1 which comprises the further step of bonding said successive winding of material to said immediately preceding winding along a second, substantially continuous, longitudinally extending bond line located in proximity to said second edge of said successive winding.

7. The method of claim 6 which includes the further step of simultaneously feeding said elongated strip from a plurality of independent sources, the strip from each source forming a winding of material which is bonded to a winding formed from a strip from another of said sources.

8. The method of claim 6 which comprises the further initial step of forming said strip of at least two parallel, adjoining, longitudinally extending portions of differing fabrics.

9. The method of claim 6 which includes the further step of cutting open the resulting assembly of multiple windings along a cutting line perpendicular to said longitudinally extending bonding lines.

10. A method of continuously forming a multi-layered sheet goods product comprising:

helically winding elongated strips of thin, pliable material upon a supporting surface, each of said strips comprising a plurality of parallel, longitudinally extending strip portions, each of which strip portions is simultaneously fed from its own independent source during said winding step;

bonding the constituent strip portions of each of said strips together along a first series of longitudinally extending bonding lines to form said strips while bonding portions of each strip to the immediately preceding strip winding along a second series of longitudinally extending bonding lines, with each successive strip winding partially overlapping the immediately preceding strip winding to a predetermined extent, said strips having first and second longitudinally extending edges;

said second series of bonding lines comprising a first bonding line located in proximity to said first edge of said immediately preceding strip winding and remote from said first and second longitudinally extending edges of said successive strip winding, and a second bonding line located in proximity to said second edge of said successive strip winding.

11. The method of claim 10 wherein said strip portions from at least two of said independent sources are formed of differing fabrics.

12. A method of making a fabric-type Venetian blind window covering comprising:

forming an elongated fabric strip having at least two parallel, adjoining, longitudinally extending first and second portions of relatively translucent and relatively opaque materials, respectively;

helically winding said strip upon a supporting surface, with each successive winding partially overlapping the preceding winding to the extent necessary so that the relatively opaque portion of the overlapping layer at least substantially covers the relatively translucent portion of the immediately preceding overlapped layer;

bonding each winding of material to the immediately preceding winding along a substantially continuous longitudinally extending bonding line, said bonding line located to coincide with the junction line between adjoining first and second portions of one of said windings and a free edge of the relatively translucent portion of the other of said windings.

13. The method of claim 12 which includes the further step of cutting open the resulting assembly of multiple windings along a cutting line perpendicular to said longitudinally extending bonding lines.

14. A method of continuously forming a fabric-type Venetian blind window covering comprising:

forming an elongated strip of thin, pliable material from two parallel, partially overlapping strip segments, said material being capable of transmitting a substantial quantity of light therethrough, said strip having first and second longitudinally extending edges which are spaced from the overlapped portion of said strip; the overlapping portions of said strip segments being secured to each other along two transversely spaced, longitudinally extending, lines of attachment, the overlapping portions between said lines of attachment defining a longitudinally extending, open-ended pocket adapted to receive an opaque insert;

helically winding said elongated strip upon a supporting surface, with each successive winding partially overlapping the immediately preceding winding to a predetermined extent;

bonding each successive winding of material to the immediately preceding winding along first and second longitudinally extending bonding lines, said first bonding line located in proximity to said first edge of said immediately preceding winding and remote from said first and second longitudinally extending edges of said successive winding, and said second bonding line being located in proximity to said second edge of said successive winding.

15. A method of making a fabric-type Venetian blind window covering comprising:

forming an elongated woven fabric strip having first and second longitudinal edges and comprising three parallel, longitudinally extending portions, said first and second portions being transversely spaced from each other and located adjacent said first and second longitudinal edges, respectively, and being formed of a relatively less dense weave which is relatively translucent, said third portion being centrally located between and adjoining said first and second portions and being formed of a relatively dense weave which is relatively opaque;

helically winding said strip upon a supporting surface, with each successive winding partially overlapping the preceding winding to the extent necessary so that the relatively opaque portion of the overlapping winding substantially covers said first relatively translucent portion of the immediately preceding overlapped winding;

bonding each winding of material to the immediately preceding winding along first and second substantially continuous, longitudinally extending, bonding lines, said first bonding line located to substantially coincide with said first edge of said preceding overlapped winding, and said second bonding line located to substantially coincide with said second edge of said overlapping successive winding.

16. The method of claim 15 which includes the further step of cutting open the resulting assembly of multiple windings along a cutting line perpendicular to said longitudinally extending bonding lines.

* * * * *